United States Patent
Gupta et al.

(10) Patent No.: US 12,035,017 B2
(45) Date of Patent: Jul. 9, 2024

(54) SYSTEM AND METHOD FOR SELECTION AND TRANSMISSION OF PERSONALIZED CONTENT TRACKS

(71) Applicant: Rovi Guides, Inc., San Jose, CA (US)

(72) Inventors: Ashish Gupta, Karnataka (IN); Vaibhav Gupta, Karnataka (IN); Senthil Kumar Karuppasamy, Karnataka (IN); Anil Kumar, Haryana (IN)

(73) Assignee: Rovi Guides, Inc., San Jose, CA (US)

( * ) Notice: Subject to any disclaimer, the term of this patent is extended or adjusted under 35 U.S.C. 154(b) by 295 days.

(21) Appl. No.: 17/507,586

(22) Filed: Oct. 21, 2021

(65) Prior Publication Data

US 2023/0126176 A1    Apr. 27, 2023

(51) Int. Cl.
*H04N 21/81*      (2011.01)
*H04N 21/2668*    (2011.01)
*H04N 21/4363*    (2011.01)
*H04N 21/488*     (2011.01)

(52) U.S. Cl.
CPC ..... *H04N 21/8106* (2013.01); *H04N 21/2668* (2013.01); *H04N 21/43637* (2013.01); *H04N 21/4884* (2013.01)

(58) Field of Classification Search
CPC .......... G06F 3/165; G06F 3/16; G06F 16/683; G06F 16/68
USPC ........................................................... 700/94
See application file for complete search history.

(56) References Cited

U.S. PATENT DOCUMENTS

| | | | |
|---|---|---|---|
| 2020/0201495 A1* | 6/2020 | Coffman | G06F 3/167 |
| 2022/0078506 A1* | 3/2022 | Sanders | H04N 21/4307 |
| 2022/0182163 A1* | 6/2022 | Shay | H04H 60/04 |

* cited by examiner

*Primary Examiner* — Alexander Krzystan
(74) *Attorney, Agent, or Firm* — HALEY GUILIANO LLP (57) ABSTRACT

Systems and methods for a computer-based process that determines content display preferences of nearby detected devices, and transmits content tracks to those devices according to their individual preferences. For example, language preferences are determined from nearby devices, and content is played with corresponding language tracks sent to each device. In this manner, different tracks of content may be sent to different devices according to each device's preferences, so that individualized or personalized versions of content may be played for each different device. Thus, for instance, content may be played with different language tracks, where each track is selected to conform to the preferences of each different device. Accordingly, content may be played with different users or viewers experiencing the content in their preferred language. Embodiments of the disclosure also contemplate any other settings and preferences besides language.

20 Claims, 7 Drawing Sheets

SYSTEM AND METHOD FOR SELECTION AND TRANSMISSION OF PERSONALIZED CONTENT TRACKS

BACKGROUND

Embodiments of the disclosure are directed generally to electronic content display systems and methods. Embodiments of the disclosure are directed more specifically to systems and methods for selection and transmission of personalized content tracks.

SUMMARY

Many computer-based electronic content display systems allow users or viewers to specify display settings for a customized viewing experience. For example, many electronic content display systems allow users to specify parameters such as the volume at which content is played, and to select a particular language for its audio track. This flexibility is limited, however. As but one example, typically only a single language is currently permitted for audio tracks. That is, only a single audio track may be played for a particular piece of content, regardless of how many viewers are present and which audio tracks they may each prefer. For instance, a mixed audience containing English, Spanish, and French speakers must all view content in the same language, e.g., English, even though some in the audience may instead prefer to view the content in Spanish and others in French.

Accordingly, to overcome the limited ability of computer-based content display systems to simultaneously display personalized content to different viewers, systems and methods are described herein for a computer-based system and process that identifies content presentation settings or preferences of nearby devices, and transmits different tracks of a particular content item to each different nearby device, according to its preferences. In this manner, content is simultaneously sent to and played on multiple different devices, with different tracks of this content sent to different viewers based on their preferences. Thus, for example, multiple different viewers may all watch the same content at the same time, but in their individual preferred languages or other audio settings. This personalizes the viewing experience for each content consumer, thus improving interest and engagement.

In some embodiments, an electronic content display system may detect the presence of other nearby devices for content play, and subsequently retrieve content display settings or preferences from any detected devices. Retrieved settings may then be used to select a particular content track for each detected device, where the track selected is chosen to be consistent with the preferences for each device. That is, for given content playing or to be played on an electronic content display system, a different track of that content may be selected for each nearby device, according to each device's preferences. For example, each nearby device may have a preferred language setting, with the content display system transmitting the corresponding language track to each device. In this manner, the content display system may play content for viewers in a default language, while simultaneously streaming the same content in different languages to each nearby device, according to the language preferences of the nearby devices. This allows for simultaneous play of different tracks of content at different devices, according to the preference settings of those different devices.

Electronic content display systems of embodiments of the disclosure may communicate with nearby devices in any manner, such as by establishing communication links via Bluetooth, near-field communication (NFC), or other protocols and methods. Embodiments of the disclosure contemplate any manner by which display systems may detect and communicate with any nearby devices.

Settings or preferences of nearby devices may also be any settings or preferences related to play of content. As an example, they may be any settings used to select a content track or determine any aspect of its play, such as a language setting or preference, a preferred volume, an equalization preference (e.g., treble or bass levels or the like), closed caption or subtitle settings, or the like.

Electronic content display systems of embodiments of the disclosure may also detect any nearby devices. That is, nearby or secondary devices used to play content tracks may be any devices capable of playing any portion of electronic content, such as portable headphones, portable speakers, cellular telephones such as smartphones, tablet computing devices, laptop computers, and the like.

Embodiments of the disclosure also contemplate listing of content according to the retrieved settings of nearby detected devices. In some embodiments, settings or preferences of nearby devices may be retrieved, and content available for play at those settings/preferences may be determined and listed for users to see. Thus, for example, language settings or preferences may be imported from detected nearby devices, and systems may determine which content is available to be played at those language settings, e.g., which content has language tracks for those specified languages. This available content, or representative thumbnails therefor, may then be displayed for users to select for viewing. In this manner, viewers may see the content that is available in their preferred languages or other settings, thus allowing for easier discovery and selection of such content and thus increased user interest and engagement.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for a computer-based process that determines content display preferences of nearby detected devices, and transmits content tracks to those devices according to their individual preferences. For example, language preferences are determined from nearby devices, and content is played with corresponding language tracks sent to each device. In this manner, different tracks of content may be sent to different devices according to each device's preferences, so that individualized or personalized versions of content may be played for each different device. Thus, for instance, content may be played with different language tracks, where each track is selected to conform to the preferences of each different device. Accordingly, content may be played with different users or viewers experiencing the content in their preferred language. Embodiments of the disclosure also contemplate any other settings and preferences besides language.

Figure 1:
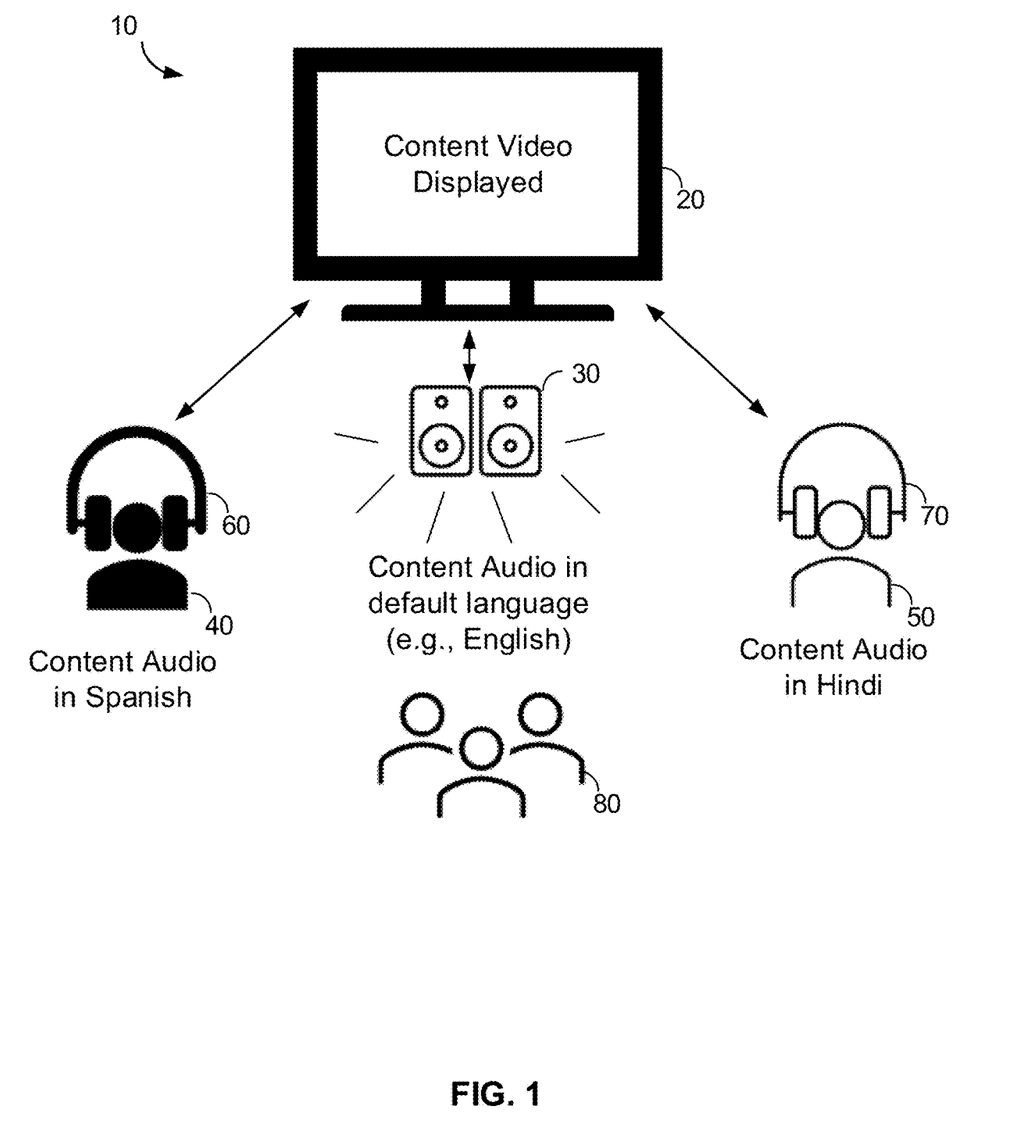
FIG. 1 illustrates operation of an exemplary system for selecting and transmitting personalized content tracks, in accordance with some embodiments of the disclosure.

FIG. 1 illustrates operation of an exemplary system for selecting and transmitting personalized content tracks, in accordance with some embodiments of the disclosure. Here, an electronic content display system 10 includes a display 20 with speakers 30. The display 20 of system 10 may be any electronic content display apparatus in electronic communication with speakers 30 such that content video may be displayed by display 20, with its corresponding audio track played by speakers 30 for an audience of viewers. Display 20 may detect a number of other devices when they are located nearby, such as headphones 60 and 70 used by users 40 and 50 respectively.

In operation, display 20 may receive and display content with a video track, and multiple audio and/or other tracks such as closed captioning or subtitles. Display 20 may display the video track on its display, and may select an audio track for play over speakers 30, both tracks being played for audience members 80. The audio track may be selected by display 20 via one or more internal settings, such as a default language setting, or may be selected by one or more audience members 80 by, e.g., remote control selection of preferred language.

Display 20 may also establish a wireless electronic communications link with nearby devices 60, 70 that it detects, such as when each device 60, 70 is enabled with hardware for implementing and executing proximity-based electronic communication links according to specified protocols such as a Bluetooth or NFC. Once such a link is established, display 20 may request and retrieve preference settings from each device 60, 70, such as preferred language, audio volume and equalization levels, and the like. Display 20 may then select a content track for each device 60, 70 that conforms to that device's preferences or settings. For example, headphones 60 may be set to Spanish as a preferred language, while headphones 70 may be set to Hindi as their preferred language. Accordingly, display 20 may transmit the Spanish-language audio track of the current content to device 60, and may transmit the Hindi-language audio track of the current content to device 70. Simultaneously, as the display 20 is set to English as its default or preferred language, it selects the English-language audio track for its own display. In this manner, display 20 displays content with audio in English for its audience members 80. Simultaneously, headphones 60 play audio of the same content in Spanish, and headphones 70 play audio of the same content in Hindi. This allows each different viewer 40, 50, 80 to view the content played by display 20 in his or her own preferred language while still having a shared content viewing experience, thus increasing user engagement and interest.

Figure 2:
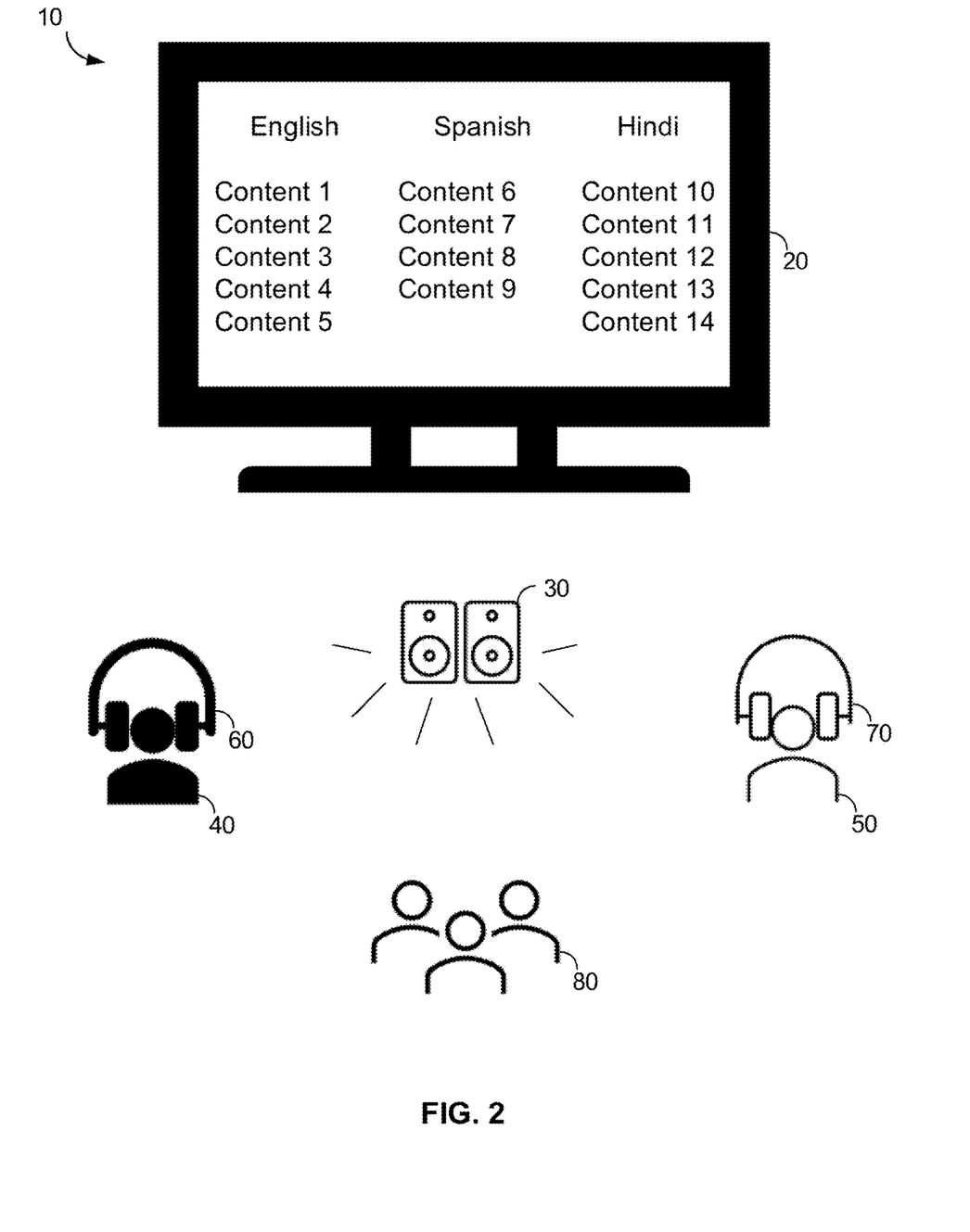
FIG. 2 illustrates operation of an exemplary system for selecting and displaying personalized content tracks, in accordance with some embodiments of the disclosure.

FIG. 2 illustrates operation of an exemplary system for selecting and displaying personalized content tracks, in accordance with some embodiments of the disclosure. In some embodiments, system 10 of FIG. 1 may operate as shown in FIG. 2. In particular, display 20 may detect nearby devices 60, 70, determine their content display preferences, and display content available to be played according to those preferences. As above, display 20 may detect nearby devices 60, 70, and retrieve their content preferences or settings such as their preferred languages, volume settings, and the like. Display 20 may then determine content that is available for those settings, and display representations of that available content for users to select and view. As an example, display 20 may be set to English as its default preferred language. Display 20 may also determine that device 60 has a language preference setting of Spanish, and device 70 has a language preference setting of Hindi. Device 20 may then search its content storage, local or remote, to determine content items which are available for each of these preferred languages. Representations of available content may then be displayed on display 20, for viewers 40, 50, 80 to view and select.

Representations of available content may be displayed in any manner. For example, icons, thumbnails, text descriptions, or other representations of available content may be displayed in any manner or order, so that viewers 40, 50, 80 may identify the available content and select content for viewing. In some embodiments of the disclosure, system 10 may search one or more content repositories or storages for content meeting the language preference settings of nearby devices 60, 70, and may list this content on display 20, such as in columnar arrangement of thumbnails or other representations, as shown in FIG. 2. If more content is available for a particular setting than may fit on one screen of display 20, content may be listed in any order or manner, such as by estimated relevance, alphabetical order, or in any other suitable manner. Selection and ordering of content, and display of content representations, according to known preferences is known, and may be performed in any manner.

Once content representations are displayed for user 40, 50, 80 view, users 40, 50, 80 may select any displayed content such as via a remote controller or their devices 60, 70, in any manner, whereupon the video track of the selected content may be played on display 20. The audio track corresponding to the default preferred language of display 20 is played on speakers 30, while simultaneously the audio track corresponding to the preferred language of device 60 is played to device 60, and the audio track corresponding to the preferred language of device 70 is played to device 70. In this manner, users may readily see content that is available for their preferences, allowing for easier and quicker content selection and thus an easier and more entertaining viewer experience.

Figure 3:
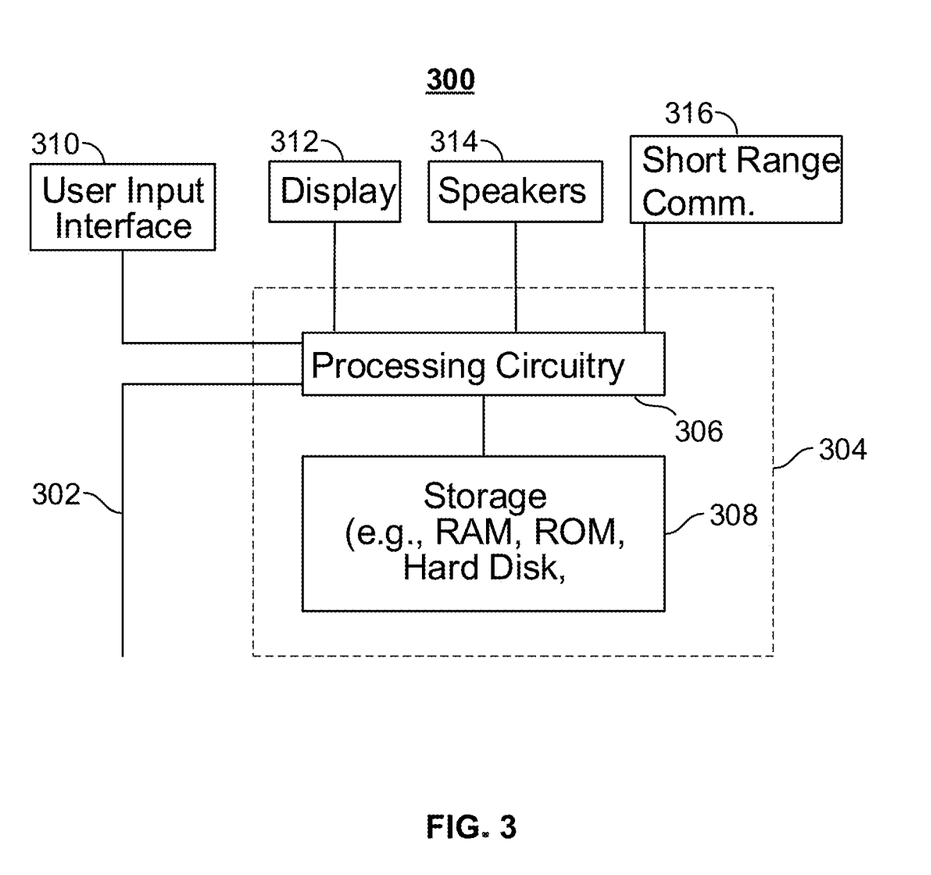
FIG. 3 is an embodiment of illustrative electronic computing devices constructed for use according to some embodiments of the disclosure.

FIG. 3 shows an embodiment of an illustrative user equipment device 300 that may serve as a display 20. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with trailer generation server 220, content server 230, or any other networks or servers. Communications circuitry may include a cable modem, an integrated services digital network (ISDN) modem, a digital subscriber line (DSL) modem, a telephone modem, an Ethernet card, or a wireless modem for communication with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308, which is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more content display applications that implement an interface allowing users to select and display content on display 312 or another display.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch-screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may correspond to speakers 30, and may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314. Short range communication module 316 may be any hardware for implementing or enabling any short range communication link with any other nearby electronic device. For example, module 316 may be a Bluetooth module containing circuitry and instructions for implementing Bluetooth functionality, e.g., allowing communication with other devices according to a Bluetooth protocol. Short range communication module 316 may, however, include circuitry and instructions for implementing any other form of short range communication, such as NFC or the like.

Figure 4:
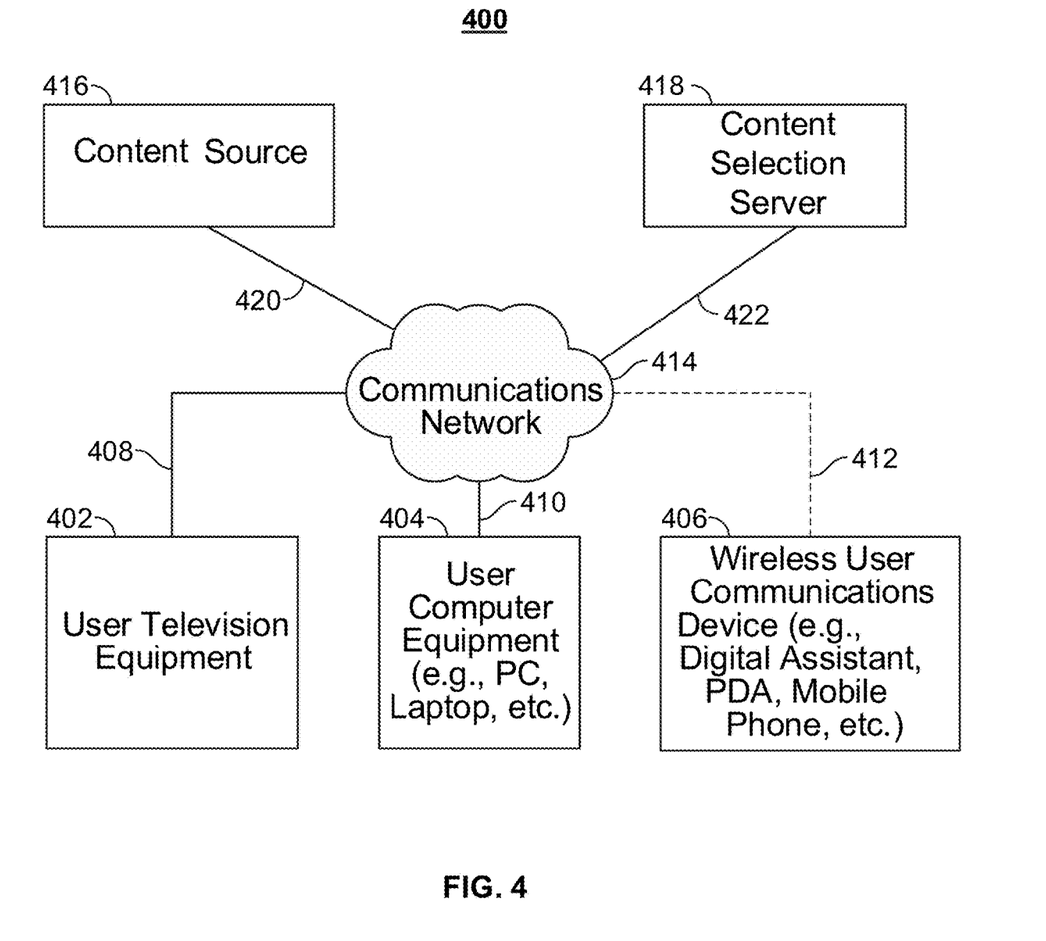
FIG. 4 is an embodiment of an illustrative system for selecting and transmitting personalized content tracks, constructed for use according to some embodiments of the disclosure.

FIG. 4 is an embodiment of an illustrative system for selecting and transmitting personalized content tracks, constructed for use according to embodiments of the disclosure. Display 20 of FIG. 1 can be implemented in system 400 of FIG. 4 as user television equipment 402, user computer equipment 404, a wireless user communications device 406, or any other type of user equipment suitable for selecting and transmitting personalized content tracks. For example, device 300 may be incorporated into display 20, e.g., television 402. Devices 60, 70 may also be, or be incorporated into, user computer equipment 404 and/or user communications devices 406. User equipment devices may be part of a network of devices. Various network configurations of devices may be implemented and are discussed in more detail below.

In system 400, there is typically more than one of each type of user equipment device but only one of each is shown in FIG. 4 to avoid overcomplicating the drawing. In addition, each user may utilize more than one type of user equipment device and more than one of each type of user equipment device.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1494 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 also includes content source 416, and content presentation server 418. The content source 416 represents any computer-accessible source of content, such as a storage for the movies, advertisements, and metadata. The content source 416 may be or include the supplemental content storages 110-1 and 110-2 as well as user profile storage 130 of FIG. 1. The content selection server 418 may store and execute various software modules for implementing the personalized content track selection, display, and transmission functionality described herein.

Figure 5:
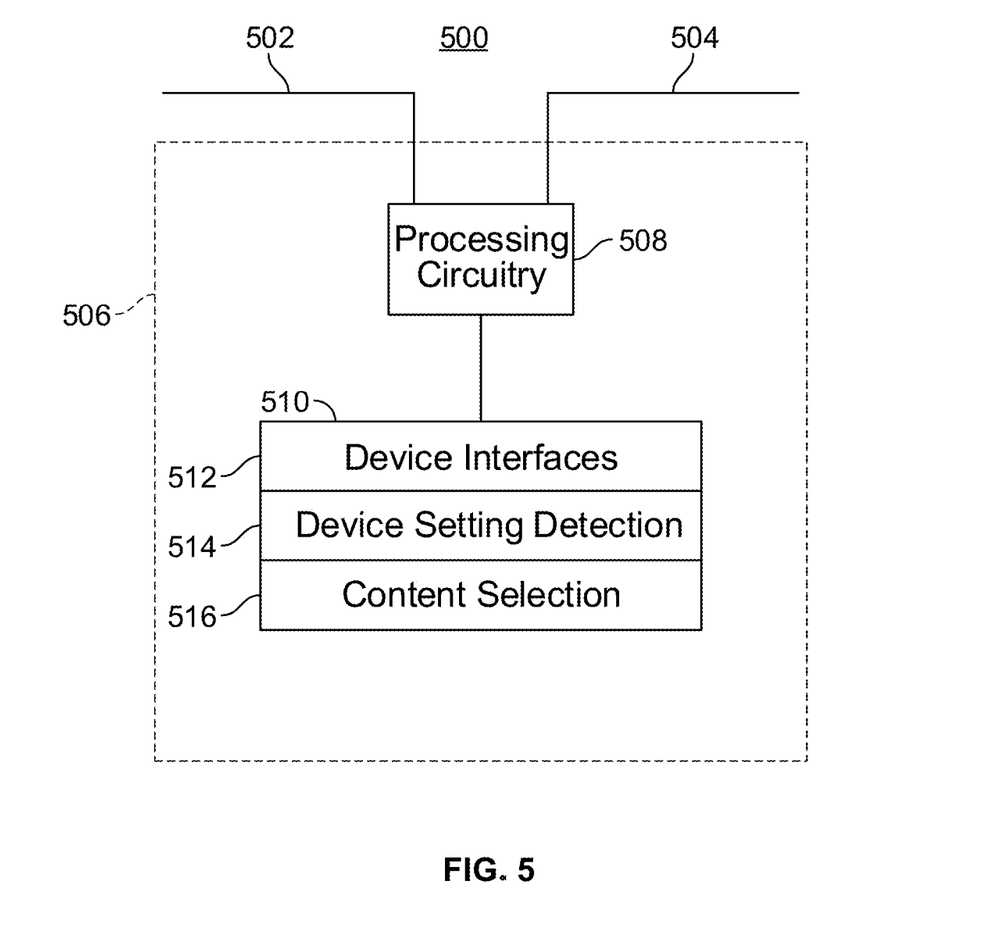
FIG. 5 is an embodiment of an illustrative content server constructed for use according to some embodiments of the disclosure.

FIG. 5 is an embodiment of an illustrative content selection server 418 constructed for use according to some embodiments of the disclosure. Here, device 500 may serve as a content selection server 418. Device 500 may receive content and data via I/O paths 502 and 504. I/O path 502 may provide content and data to the various devices 200 and/or server 220, while I/O path 504 may provide data to, and receive content from, content database 240. Like the device 400, the device 500 has control circuitry 506, which includes processing circuitry 508 and storage 510. The control circuitry 506, processing circuitry 508, and storage 510 may be constructed, and may operate, in a similar manner to the respective components of device 400.

Storage 510 is a memory that stores a number of programs for execution by processing circuitry 508. In particular, storage 510 may store a number of device interfaces 512, a device setting detection module 514 for retrieving content preferences or settings of nearby detected devices 60, 70, and content selection module 516 for selecting content according to device preferences or settings retrieved by module 514. The device interfaces 512 are interface programs for handling the exchange of commands and data with the various devices 404, 406 (e.g., devices 60, 70).

Any of the various modules and functions described herein may reside on any one or more devices. For example, device setting detection and content selection functionality may reside on display 20, or a remote server such as content presentation server 418.

Figure 6:
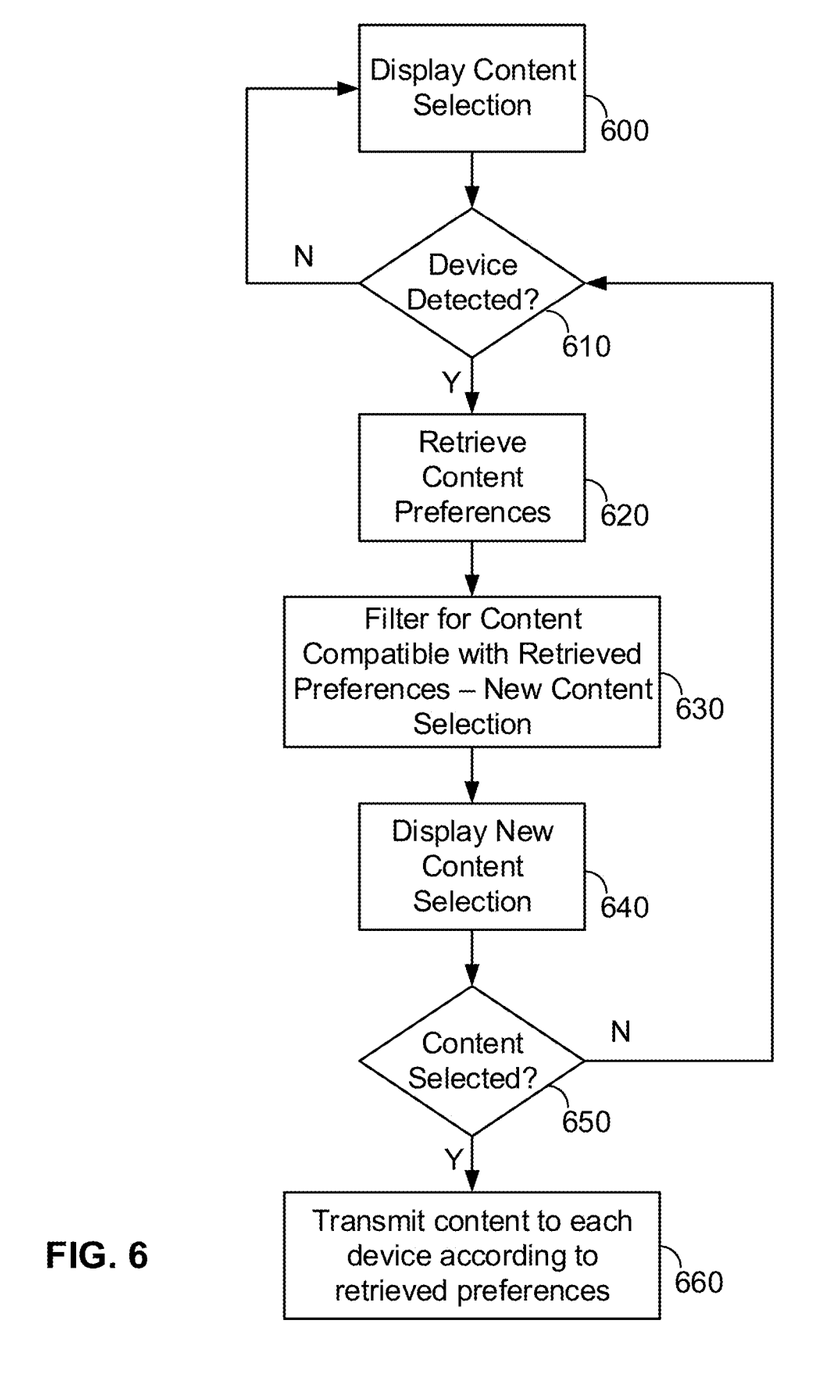
FIG. 6 is a flowchart illustrating processing steps for selecting and transmitting personalized content tracks, in accordance with some embodiments of the disclosure.

FIG. 6 is a flowchart illustrating processing steps for selecting and transmitting personalized content tracks, in accordance with some embodiments of the disclosure. Here, display 20 may initially display a content selection (Step 600). This may be any set or group of content for perusal or selection by a viewer. The short range communication module 316 may check for nearby devices (Step 610) such as devices 60, 70, with content selection continuing to be displayed while no new device is detected. However, if a device such as device 60, 70 is detected, module 316 forms a short-range communication link with the device 60, 70 and requests or commands delivery of the content presentation preferences or settings of these devices 60, 70. These content presentation preferences or settings may be any preferences or settings for control of any aspect of content presentation, and may for example include any one or more of a preferred language for content audio, volume settings, equalization settings such as treble or bass levels, brightness settings, screen size or dimensions, or any other desired settings. Any such settings may be retrieved by device 20 (Step 620) for transmission to content selection server 418.

Server 418 may then filter for content compatible with these retrieved preferences (Step 630). Filtering of content may include identifying and retrieving representations or other descriptions of identified content, which matches or conforms with the retrieved content preferences or settings. For example, if the retrieved preferences include a language preference, filtering may include identifying and selecting that content which has a language track for that preferred language. Server 418 may conduct this filtering by searching content stored in a specified location, such as content source 416, and retrieving matching content or representations stored therein.

Server 418 may then transmit the representations of filtered content, i.e., the results of Step 630, to display 20 for display (Step 640). As above, representations of content, such as icons, thumbnail images, content descriptions, and the like may be displayed in any manner, such as by curation or arrangement via any known methods, and subsequent display.

A viewer 40, 50, 80 may then content from among the displayed representations (Step 650). If no selection is detected, the process of some embodiments may return to Step 610, with display 20 continuing to display filtered content representations. If a selection is detected, server 418 and/or display 20 may transmit the selected content to each nearby detected device 60, 70 according to the retrieved preferences for that device 60, 70 (Step 660). In this manner, as above, nearby devices 60, 70 are detected and their content display preferences retrieved, where content selection of display 20 is altered to display a selection of that content which conforms or is consistent with these retrieved preferences. In this manner, viewers are shown more preferred content, increasing user engagement and interest.

Figure 7:
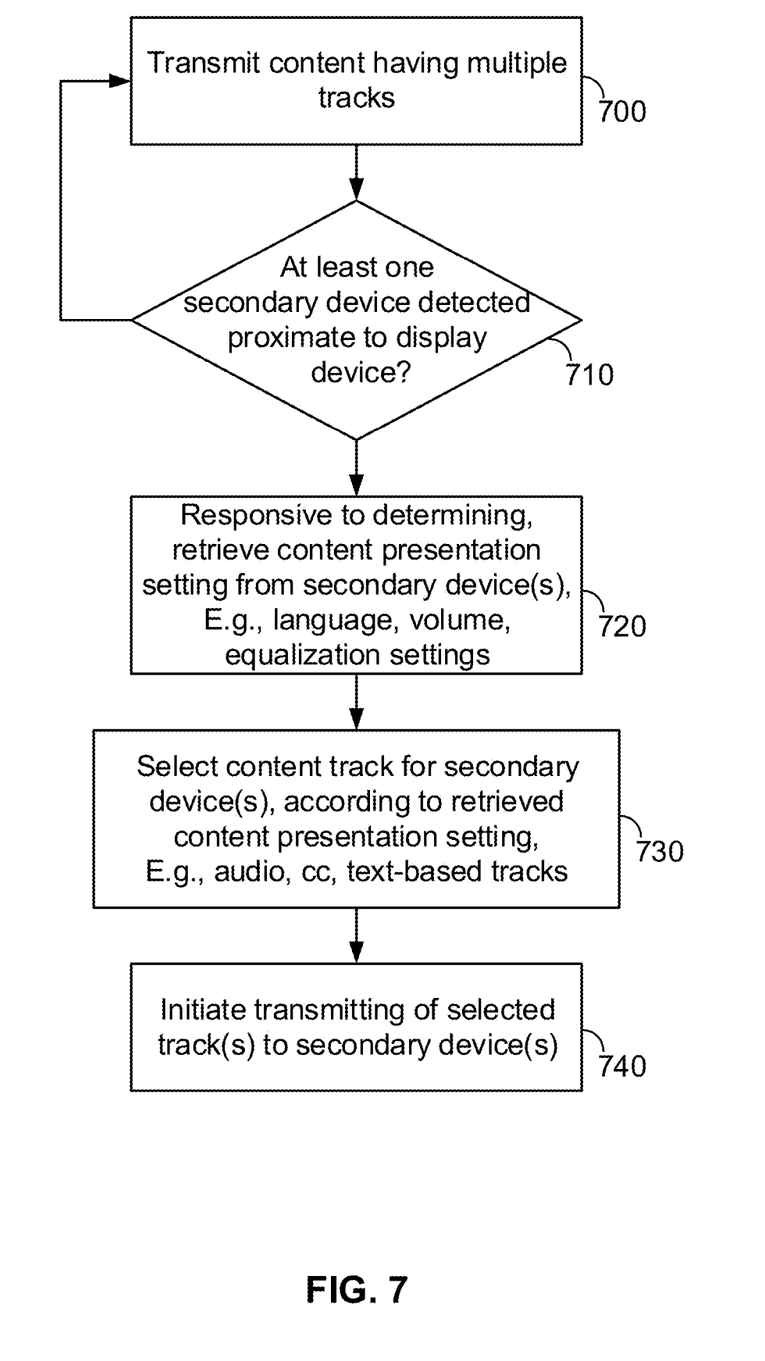
FIG. 7 is a flowchart illustrating processing steps for selecting and displaying personalized content tracks, in accordance with some embodiments of the disclosure.

FIG. 7 is a flowchart illustrating processing steps for selecting and displaying personalized content tracks, in accordance with some embodiments of the disclosure. Here, an exemplary process may begin with server 418 transmitting content to display 20, where this transmitted content has multiple tracks (Step 700). These tracks may be any content tracks for any content, including without limitation audio tracks, closed captioning, subtitles, and the like. At any point prior or subsequent to play of this content, display 20 may check for the presence of a secondary device, or device different from display 20, located proximate to display 20 (Step 710). Here, a secondary device such as devices 60, 70 may be proximate to display 20 if they are within detection range of the short-range communication capability of display 20. If a device is detected, display 20 retrieves content presentation settings from the detected device (Step 720). As above, these settings may be any settings for control of any aspect of content presentation, and may for example include any one or more of a preferred language for content audio, volume settings, equalization settings such as treble or bass levels, brightness settings, screen size or dimensions, or any other desired settings.

Display 20 or server 418 may then select tracks of the content transmitted in Step 700, according to the retrieved content presentation settings of the detected device (Step 730), and initiate transmission of these selected tracks to the detected devices (Step 740). That is, each detected device 60, 70 is sent content tracks according to its content presentation settings, so that it may play these tracks along with display of the content on display 20. For example, display 20 may detect a device and retrieve a language setting indicating a preference for Spanish. The display 20 may then select the Spanish language audio track from among the tracks it receives at Step 700, and send this Spanish track to the detected device. The device may then play the Spanish audio track concurrently with display of the video content on display 20, so that the device user may view content on display 20 while listening to the Spanish audio version of the content on his or her device. Each other detected device may also receive content tracks according to their individual language settings, so that every viewer of display 20 may watch the content displayed thereon while simultaneously listening to the audio of that content in their preferred language. In this manner, embodiments of the disclosure provide for personalized content tracks to be sent to each nearby detected device, allowing viewers to experience content tailored to their individual preferences.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, displays may detect any other secondary devices of any type, and retrieve any settings or preferences. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
   transmitting, for presentation on a display device, content having multiple tracks;
   determining a presence of at least one secondary device proximate to the display device;
   responsive to the determining, retrieving a content presentation setting from the at least one secondary device;
   determining content that is available for the retrieved content presentation setting and available to the at least one secondary device;
   providing for display representations of the available content for user selection and viewing, wherein the display representations include all available languages for each of the available content;
   providing for display a user selectable option for each of the available content; and
   in response to user selection of the user selectable option to select one of the available content,
      selecting a track of the content for the at least one secondary device, according to the respective retrieved content presentation setting; and
      initiating a transmitting of the selected track of the content to the at least one secondary device.

2. The method of claim 1, wherein the determining further comprises establishing a communication link with the at least one secondary device, and wherein the retrieving further comprises retrieving the content presentation setting using the communication link.

3. The method of claim 2, wherein the communication links include one or more of a Bluetooth link or a near-field communication link.

4. The method of claim 1, wherein the content presentation setting is one or more of a language setting, a volume setting, or an equalization setting.

5. The method of claim 1, wherein the at least one secondary device is one or more of a headphone, a speaker, a cellular telephone, a tablet computing device, or a laptop computer.

6. The method of claim 1, wherein the tracks are one or more of audio tracks having audio recorded in specified languages, or closed caption tracks having text in specified languages.

7. The method of claim 1, wherein:
the retrieving further comprises retrieving first and second content presentation settings from the at least one secondary device;
the selecting further comprises selecting the track of the content for the at least one secondary device, according to the respective first content presentation setting; and
the initiating further comprises initiating the transmitting of the selected track of the content to the at least one secondary device for play according to the respective second content presentation setting,
wherein the first content presentation setting comprises a language setting, and the second content presentation setting comprises one or more of a volume setting, or an equalization setting.

8. The method of claim 1, wherein the retrieved content presentation setting is a first content presentation setting, and wherein the presentation on the display device further comprises play of the content according to one or more second content presentation settings different from the first content presentation setting.

9. The method of claim 1, further comprising determining identifiers of content having at least one track playable according to at least one retrieved content display setting, and transmitting the identifiers for display on the display device.

10. A system comprising:
a storage device; and
control circuitry configured to:
transmit, for presentation on a display device, content having multiple tracks;
determine a presence of at least one secondary device proximate to the display device;
responsive to the determining, retrieve a content presentation setting from the at least one secondary device;
determine content that is available for the retrieved content presentation setting and available to the at least one secondary device;
provide for display representations of the available content for user selection and viewing, wherein the display representations include all available languages for each of the available content;
provide for display a user selectable option for each of the available content; and
in response to user selection of the user selectable option to select one of the available content,
select a track of the content for the at least one secondary device, according to the respective retrieved content presentation setting; and
initiate a transmitting of the selected track of the content to the at least one secondary device.

11. The system of claim 10, wherein the determining further comprises establishing a communication link with the at least one secondary device, and wherein the retrieving further comprises retrieving the content presentation setting using the communication link.

12. The system of claim 11, wherein the communication links include one or more of a Bluetooth link or a near-field communication link.

13. The system of claim 10, wherein the content presentation setting is one or more of a language setting, a volume setting, or an equalization setting.

14. The system of claim 10, wherein the at least one secondary device is one or more of a headphone, a speaker, a cellular telephone, a tablet computing device, or a laptop computer.

15. The system of claim 10, wherein the tracks are one or more of audio tracks having audio recorded in specified languages, or closed caption tracks having text in specified languages.

16. The system of claim 10, wherein:
the retrieving further comprises retrieving first and second content presentation settings from the at least one secondary device;
the selecting further comprises selecting the track of the content for the at least one secondary device, according to the respective first content presentation setting; and
the initiating further comprises initiating the transmitting of the selected track of the content to the at least one secondary device for play according to the respective second content presentation setting,
wherein the first content presentation setting comprises a language setting, and the second content presentation setting comprises one or more of a volume setting, or an equalization setting.

17. The system of claim 10, wherein the retrieved content presentation setting is a first content presentation setting, and wherein the presentation on the display device further comprises play of the content according to one or more second content presentation settings different from the first content presentation setting.

18. The system of claim 10, wherein the control circuitry is further configured to determine identifiers of content having at least one track playable according to at least one retrieved content display setting, and transmitting the identifiers for display on the display device.

19. The method of claim 1, comprising:
providing for display an interactive media guidance application including information based on media guidance data, the representations of the available content, and the user selectable option for each of the available content.

20. The system of claim 10, wherein the control circuitry is further configured to:
provide for display an interactive media guidance application including information based on media guidance data, the representations of the available content, and the user selectable option for each of the available content.

* * * * *